(12) United States Patent
Flegel et al.

(10) Patent No.: US 7,602,083 B1
(45) Date of Patent: Oct. 13, 2009

(54) APPARATUS AND METHOD FOR POWERING LOAD CENTER CIRCUITS WITH AN AUXILIARY POWER SOURCE

(75) Inventors: Jeffrey D. Flegel, Racine, WI (US); Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 75 days.

(21) Appl. No.: 11/801,171

(22) Filed: May 9, 2007

(51) Int. Cl.
*H01H 47/00* (2006.01)
*H01H 35/00* (2006.01)
*H01H 83/18* (2006.01)
*H02H 3/02* (2006.01)
*H02H 3/42* (2006.01)

(52) U.S. Cl. .......................... 307/126; 307/64
(58) Field of Classification Search ................. 307/126, 307/64
See application file for complete search history.

(56) References Cited

U.S. PATENT DOCUMENTS

| | | | |
|---|---|---|---|
| 5,268,850 A | 12/1993 | Skolund | |
| 5,393,942 A * | 2/1995 | Reiner et al. | ............... 200/50.4 |
| 5,895,981 A | 4/1999 | Flegel | |
| 6,163,449 A | 12/2000 | Flegel | |
| 6,172,432 B1 | 1/2001 | Schnackenberg et al. | |
| 6,184,595 B1 | 2/2001 | Flegel | |
| 6,563,233 B1 | 5/2003 | Hinks | |
| 6,621,689 B1 | 9/2003 | Flegel | |
| 6,791,211 B1 | 9/2004 | Flegel | |
| 6,971,399 B2 * | 12/2005 | Cowan | ....................... 137/209 |
| 7,119,457 B1 | 10/2006 | Flegel | |

* cited by examiner

*Primary Examiner*—Stephen W Jackson
*Assistant Examiner*—Carlos Amaya
(74) *Attorney, Agent, or Firm*—Boyle Fredrickson, S.C.

(57) ABSTRACT

An electrical distribution system is designed to automatically connect a dedicated group of circuits, which are normally powered by a primary power source, to an auxiliary power source upon detection that there has been a disruption or failure in the primary power source. The system includes a switching arrangement that allows an operator to manually connect the auxiliary power source with other circuits that are not generally powered during disruption of the primary power source. The switching arrangement includes and interlinked breaker arrangement that prevents any of the other circuits that are normally powered by the primary source from being automatically connected to the primary power source when primary power source is restored if those other circuits are connected to the auxiliary power source when the primary power source is restored.

25 Claims, 1 Drawing Sheet

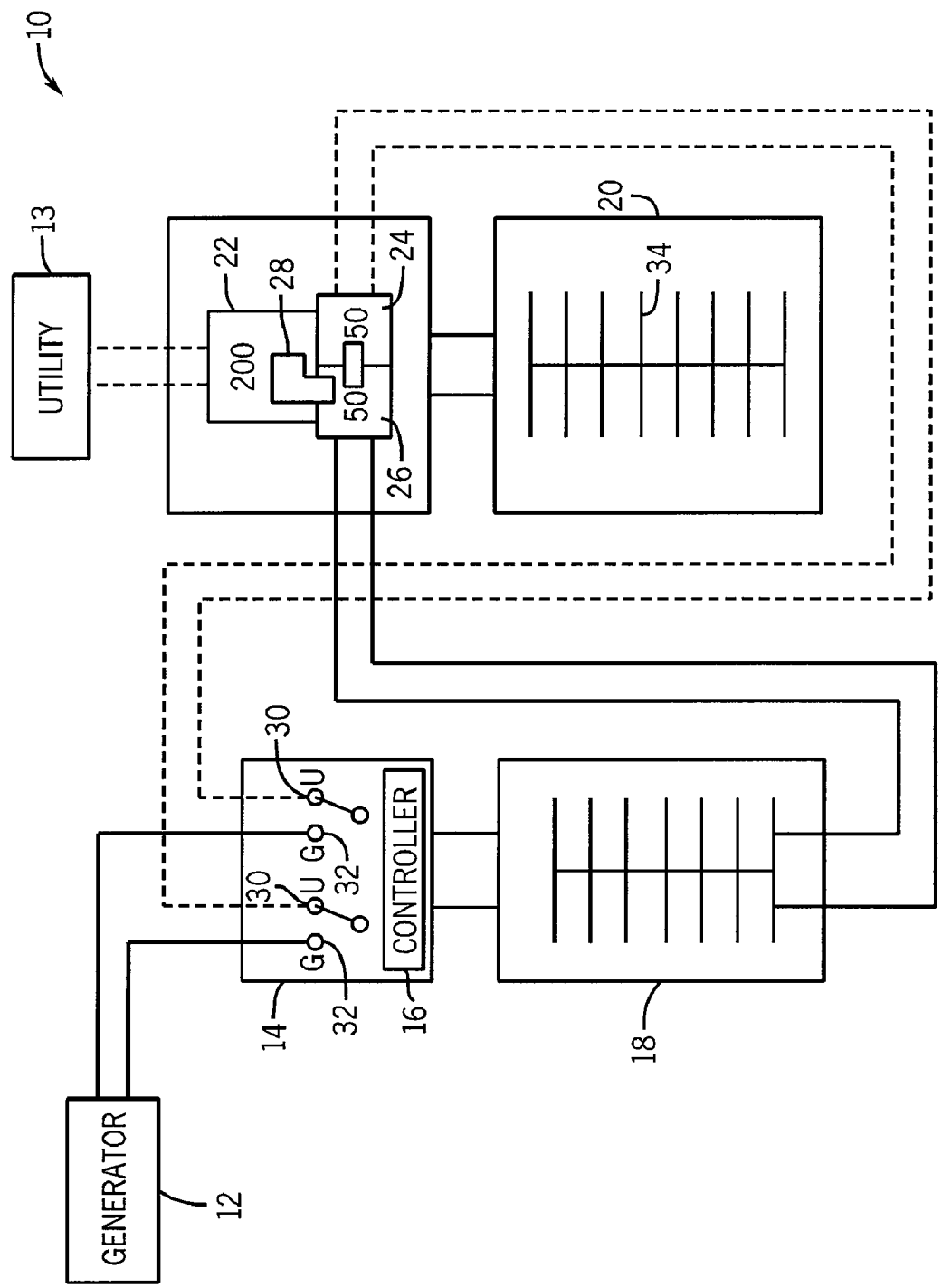

APPARATUS AND METHOD FOR POWERING LOAD CENTER CIRCUITS WITH AN AUXILIARY POWER SOURCE

BACKGROUND OF THE INVENTION

This invention relates generally to coordinating power delivery to critical and non-critical loads of a building or similar structure during main or primary power failure. More particularly, the present invention is directed to a transfer switch that allows circuits of a load center to be connected to an auxiliary power source when primary power fails.

A building, such as a home or other dwelling, will present critical and non-critical loads to the primary power source to the building, which is generally a utility power supply. The critical loads for a home, for instance, may include the HVAC system, sump pump, refrigerators, freezers, dishwasher, washer/dryer, and life-sustaining medical equipment. All other loads of the home will generally be considered non-critical. The non-critical loads are generally connected to non-critical branches that are hardwired to a load center and the critical loads may be connected to critical branches that are hardwired to a separate subpanel; both of which are powered by the primary power source during normal primary power source operation.

To ensure power to the critical loads during primary power source failure, it is known to connect the subpanel and, thus, the critical loads, to an auxiliary power source, such as electrical generator. This connection of the subpanel to the auxiliary power source may be done automatically by an automatic auxiliary power supply system that detects primary power source failure and automatically starts an auxiliary power source, such as an electrical generator, when primary power source failure is detected. The automatic auxiliary power supply system also includes an automatic transfer switch that switches over connection of the subpanel to the auxiliary power source generator. In this regard, the subpanel is connected to the primary power source and the auxiliary power source through a transfer panel that contains the automatic transfer switch. In some installations, the automatic transfer switch and the subpanel are both contained within the transfer panel.

Conventional transfer switches connect only the circuits hardwired to the subpanel to the auxiliary power source. In this regard, during operation of the auxiliary power supply system, it is not possible for an operator, such as a homeowner, to power a non-critical load with the auxiliary power source in the event the homeowner happens to be home when the primary power source fails. For instance, with conventional automatic transfer switches, a homeowner cannot temporarily connect a non-critical load, such as a television or radio, to the auxiliary generator when the primary power source fails.

One proposed automatic transfer switch is disclosed by Hinks, U.S. Pat. No. 6,563,233, which allows an operator to manage, or utilize auxiliary power for energizing a load center circuit through manipulation of a manual feedback breaker and main branch breakers. More particularly, Hinks describes a system whereby a normally closed manual feeder breaker connects the primary power source to the subpanel during normal primary power source operation. When the primary power source fails, the automatic transfer switch activates the auxiliary power source. In order to connect the load center to the auxiliary power source, the operator may manually close a normally open manual feedback breaker, which supplies power to all circuits of the load center. However, in the system described by Hinks it is possible for the normally closed manual feeder breaker and the normally open manual feedback breaker to both be closed at the same time, which can result in the entire load center being automatically connected to the auxiliary power source when the auxiliary power source is subsequently brought online, which not only is in violation of the U.S. National Electrical Code but also likely results in a load that exceeds the capacity of the generator. That is, the system described by Hinks allows those circuits of the load center having closed main branch breakers to be automatically connected to the auxiliary power source when the normally open manual feedback breaker is closed. To avoid circuits of the load center from being connected to the auxiliary power source upon closing of the manual feedback breaker, the operator must individually open each of the conventional main branch breakers for those load center circuits. Additionally, Hinks describes the need for a "second" main breaker to avoid backfeeding of the primary power source when the auxiliary power source is supplying power to the load center.

Therefore, it is desirable to have an automatic transfer switch that is capable of connecting a main or non-critical circuit to an auxiliary power source during primary power failure in a manner that is compliant with the U.S. National Electrical Code. It is also desirable to have a transfer switch that is isolated from the primary power source when a load center circuit is connected to the auxiliary power source so that the transfer switch does not sense auxiliary power as primary power. It would be further desirable to have a transfer switch that does not backfeed the primary power source when a load center circuit is connected to the auxiliary power source.

BRIEF DESCRIPTION OF THE INVENTION

The present invention is directed to a transfer switch for an auxiliary power supply system, which allows manual connection of one or more load center circuits to an auxiliary power source during primary power source failure. The transfer switch is constructed such that an operator must manually disconnect the load center from the primary power source to energize the load center circuit with the auxiliary power source. Moreover, if the operator has manually disconnected the load center from the primary power source, the operator must manually reconnect the load center to the primary power source when the primary power source is restored. In this regard, the restored primary power source is not automatically reconnected to the load center if a load center circuit is connected to the auxiliary power source. In one embodiment, an interlinked breaker arrangement is used to prevent a load center circuit being energized by an auxiliary power source from also being connected to the primary power source when the primary power source is restored or otherwise brought back online.

Therefore, in accordance with one aspect, the present invention is directed to an assembly that coordinates powering of a subpanel when a primary power source that normally provides power to a load center and the subpanel fails. The assembly includes a transfer switch that automatically causes an auxiliary power source to provide power to the subpanel when the primary power source fails to provide power. The assembly further includes an interlinked breaker arrangement that connects selected load center circuits to the auxiliary power source and disconnects the load center from the primary power source when an operator desires that the selected load center circuits be powered when main power fails.

In accordance with another aspect, the present invention is directed to a transfer switch connected to a primary power source that supplies power to a load center and a subpanel. When the primary power source fails, the transfer switch is caused to automatically connect the subpanel to an auxiliary power source and responsive to a manual operation, simultaneously connect the load center to the auxiliary power source and disconnect to the load center from the primary power source. The transfer switch is further caused to maintain disconnection of the load center from the primary power source even when the primary power source is restored.

According to a further aspect, the invention contemplates a method of providing power to circuits of a dwelling during primary power failure. The method includes automatically connecting a subpanel to an auxiliary power source when a primary power source fails, to provide power to the subpanel. The method further includes manually connecting the auxiliary power source to the load center in order to power one or more circuits of the load center, and subsequently manually disconnecting the auxiliary power source to the load center after power from the primary power source is restored. In the event the auxiliary power source is not manually connected to the load center, the method includes automatically reconnecting the load center and the subpanel to the primary power source when the primary power source is restored.

Various other features and advantages of the present invention will be made apparent from the following detailed description and the drawings.

BRIEF DESCRIPTION OF THE DRAWINGS

The FIGURE illustrates one preferred embodiment presently contemplated for carrying out the invention. The FIGURE is a wiring diagram of an automatic transfer switch and auxiliary power system for maintaining power to critical or emergency circuits while permitting powering of selected non-emergency circuits with auxiliary power according to one embodiment of the present invention.

DETAILED DESCRIPTION OF THE PREFERRED EMBODIMENT

The invention is directed to a circuit and switch assembly that can be used in combination with an automatic transfer switch and generator package, in either a new installation or in a retrofit manner. The circuit and switch assembly is designed to allow any circuit, not just emergency or critical circuits, to be powered by an auxiliary power source, such as a generator, during primary power source failure. Insofar as the present invention relates to the automatic connection of critical or emergency loads to an auxiliary or auxiliary power source in the event of primary power source failure or disruption, such functionality is well-known in the art. For example, U.S. Pat. No. 7,119,457, the disclosure of which is incorporate herein by reference, describes a transfer switch that connects loads in order of priority to auxiliary power. It is understood that the present invention is applicable with such transfer switches and other transfer switches that provide automatic connection of circuits to an auxiliary power source.

Accordingly, the present invention will be described with respect to the FIGURE that shows a wiring diagram of an automatic transfer switch assembly and auxiliary power source system 10, in accordance with the present invention. System 10 includes an auxiliary power source 12 that provides power to a transfer switch 14 in a known manner. The transfer switch 14 is controlled by a controller 16 that automatically switches the transfer switch 14 so that a subpanel 18 connects to the auxiliary power source if a loss of primary power is detected. In this regard, the system 10 may include various voltage and current sensors (not shown) as known in the art to detect a disruption or loss in main power.

As noted above, in a customary installation, the subpanel 18 contains those circuits that are connected to critical or emergency loads, such as the HVAC system, appliances, water pumps, emergency lighting, and the like. All other loads of the building are connected to the primary power source, shown at 13, through a load center or main panel 20. In conventional transfer switch and generator packages, the circuits of the load center, which are typically non-critical or non-emergency circuits, can only be energized by the primary power source. In accordance with the present invention, however, and as will be described below, the present invention contemplates the connection of selected non-critical or non-emergency circuits of the load center to the auxiliary power source 12 when power from the primary power source 13 is interrupted.

In accordance with conventional systems, power to the load center 20 is controlled by a main breaker 22. In one embodiment, the main breaker 22 is a 200 A breaker. As is known, when the main breaker 22 is in the ON position, power from the primary power source 13 is available to all of the branch circuits, including a branch circuit 34 for example, of the load center 20 provided the individual breakers (not shown) for the branch circuits are also in the ON position.

As discussed above, a limitation of conventional transfer switch systems is that circuits of the load center 20, such as branch circuit 34, cannot be powered by the auxiliary power source 12 when there is a disruption in or loss of power from the primary power source 13. The present invention overcomes this limitation with implementation of an auxiliary system circuit breaker 24 and an auxiliary system feeder breaker 26. As will be described below, breakers 24, 26 as well as main breaker 22 are interlinked or interlocked by an interlock assembly 28. An exemplary interlock assembly is described in U.S. Pat. No. 6,621,689, the disclosure of which is incorporated herein by reference. The interlock assembly 28 prevents the interlinked breakers 24, 26 from being in ON positions simultaneously. The applicability of such a feature to the present invention will be described in greater detail below. It is noted that in one embodiment, breakers 24, 26 are both 50 A breakers; however, the present invention is not so limited.

Circuit breaker 24 controls the delivery of primary power to the transfer switch 14. Specifically, when the primary power source 13 is operational, breaker 24 feeds the primary power to the transfer switch 14 that then feeds the primary power to the subpanel 18. In this regard, the circuits of the subpanel 18 are energized in parallel with the circuits of the load center 20 during normal operation of the primary power source 13.

Circuit breaker 26 is designed to control power delivery from the auxiliary power source 12 to the load center 20 when there is a disruption or failure in primary power source 13. As such, the present invention, in contrast to conventional transfer switch and auxiliary power systems, energizes the load center 20, or selected circuits thereof, when the primary power source 13 is not delivering power. Because the breakers 24, 26 are interlinked, breaker 26 cannot be in the ON position when breaker 24 is in the ON position. That is, when breaker 26 is switched to the ON position, breaker 24 must necessarily be in the OFF position. This configuration prevents the controller 16 of the transfer switch 14 from mistakenly sensing auxiliary power as restoration of the primary power source 13. In a similar manner, breaker 24 cannot be in the ON position when breaker 26 is in the ON position, which ensures that power cannot be supplied to the load center 20 from both the primary power source 12 and the auxiliary power source 13.

Operation of the transfer switch and auxiliary power system in which auxiliary power is provided by a generator in accordance with one embodiment of the present invention will now be described with further reference to the FIGURE. When the primary power source 13 is operational, power is supplied through the main breaker 22 to all the circuits of the load center 20. Circuit breaker 24 feeds primary power from the primary power source 13 to the utility input(s) 30 on the transfer switch 14, which powers all the circuits in the subpanel 18. When primary power source 13 fails or is otherwise unavailable, the controller 16 of the transfer switch 14 detects a loss of primary power, automatically starts the generator 12, and automatically switches the subpanel 18 over to auxiliary power at generator input(s) 32. As such, the generator 12 powers all the circuits of the emergency subpanel 18. At this moment, none of the circuits of the load center 20 are powered as the primary power source 13 is not operative. However, the present invention allows an operator, such as a homeowner, to manually select one or more circuits of load center 20, such as load center circuit 34, to be powered by the generator 12 despite the loss of primary power.

Specifically, the operator may switch the main breaker 22 into the OFF position, which isolates the load center 20 from the primary power source 13. The operator then manually switches all of the distributed breakers in the load center 20 into the OFF position. Alternatively, the distributed breakers of load center 20 may be constructed such that each breaker is automatically switched to the OFF position when the main breaker 22 is switched OFF, and must be reset into the ON position to connect a respective circuit to the primary power source 13 when the main breaker 22 is switched into the ON position. Thus, when the main breaker is manually switched into the OFF position, the distributed breakers are either manually or automatically in an OFF state.

When the main breaker 22 is placed into the OFF position, the operator may then manually switch the interlinked input breaker 26 into the ON position. In order to do so, however, interlock assembly 28 must first be positioned so as to enable movement of input breaker 26 to the ON position, which can only occur when main breaker 22 is in the OFF position. This ensures that load center 20 and subpanel 18 are isolated from primary power source 13. Breaker 24 and input breaker 26 are interlinked, such that movement of input breaker 26 to the ON position necessarily places breaker 24 into the OFF position. At this point, input breaker 26 is in a conductive state and in series with the subpanel 18. As a result, auxiliary power from generator 12 is available to the load center 20, provided the load capacity of the generator 12 has not been reached by the active circuits of the subpanel 18. Moreover, because breaker 24 and main breaker 22 are in the OFF position, the automatic transfer switch 14 does not see the power delivered to the load center 20 by generator 12 at utility power inputs 30, which ensures that the automatic transfer switch 14 does not mistake auxiliary power delivered to the load center 20 as restored primary power.

In the event the operator wishes to utilize one of the non-critical circuits of load center 20, e.g. circuit 34 (with which a non-critical load such as a television, radio, non-critical room lights, etc. may be interconnected), the operator manually closes circuit 34 of the load center through a reset of the distribution breaker for that circuit 34. Since input breaker 26 is positioned so as to deliver power from generator 12 to load center 20, the generator 12 will provide auxiliary power to the closed circuit 34 to supply power to the non-critical load. If the operator makes such a connection, the generator 12 supplies power to the subpanel 18 even when primary power is restored, as described below. Moreover, since the main breaker 22 is in the OFF state, auxiliary power is not backfed to the primary power source 13.

In the event primary power is restored and the operator has not connected load center 20 to the auxiliary power source, i.e., the main breaker 22 remains in the ON position and breaker 26 remains in the OFF position, the transfer switch 14 automatically switches back to its utility inputs 30 and the circuits in the subpanel 18 return to be powered by the primary power source 13 through main breaker 22, auxiliary system breaker 24, and the transfer switch 14. On the other hand, if a load center circuit, such as circuit 34, is connected to the transfer switch 14 when primary power is restored with main breaker 22 in the OFF position and auxiliary system feeder breaker 26 in the ON position, the return of primary power will have no impact on the system.

Specifically, in order to power the system from primary power source 13 when utility power is restoree, the operator must manually switch input breaker 26 into the OFF position and manually switch main breaker 22 into the ON position, and return all the distribution breakers in the load center 20 to the ON position. As such, the load center 20 is only reenergized by the primary power source if the operator manually switches breaker 26 into the OFF position and the main breaker 22 is switched to the ON position. While breakers 24, 26 are interlinked, switching breaker 26 into the OFF position does not necessarily move breaker 24 into the ON position, and the operator must manually move breaker 24 to the ON position after breaker 26 has been placed into the OFF position. After breaker 26 has been placed into the OFF position and breakers 22 and 24 have been returned to the ON position, the controller 16 of the automatic transfer switch detects the return of primary power, and reconnects the subpanel 18 to the primary power source 13. This results in the load center 20 and the subpanel 18 being powered by the primary power source 13 and auxiliary power source 12 is automatically powered down or switched OFF.

As described above, the present invention employs an interlinked breaker arrangement to prevent the automatic transfer switch from sensing auxiliary power as restored primary power. Moreover, the present invention allows auxiliary power to be presented to circuits of a load center while preventing backfeeding of the primary power source without the need for a dedicated, and additional, main breaker.

One skilled in the art will appreciate that the present invention realizes a number of advantages over automatic transfer switches of the prior art. One such advantage is that the present invention is compliant with the U.S. National Electrical Code which has been adopted by most U.S. states, thereby making the present invention a viable solution for consumers that desire to power non-critical loads with auxiliary power during primary power source outage without disconnecting critical loads, such as refrigeration and HVAC systems and medical equipment, from auxiliary power. In this regard, the present invention may be particularly advantageous for homeowners and other operators that use auxiliary power on a semi-permanent basis when there has been a sustained or prolonged loss of primary power, e.g., hurricane or flood stricken communities, yet desire to occasionally or temporarily power non-critical loads, such as televisions, stereo equipment, cellular phone chargers, and computers despite the loss of primary power.

Therefore, in accordance with one aspect, the present invention is directed to an assembly that coordinates powering of a subpanel upon failure of a primary power source that normally provides power to a load center and the subpanel. The assembly includes a transfer switch that automatically causes an auxiliary power source to provide power to the subpanel when the primary power source fails to provide power. The assembly further includes an interlinked breaker arrangement that connects selected load center circuits to the auxiliary power source and disconnects the load center from the primary power source when an operator desires that the selected load center circuits be powered when main power fails.

In accordance with another aspect, the present invention is directed a transfer switch connected to a primary power source that supplies power to a load center and a subpanel. When the primary power source fails, the transfer switch is caused to automatically connect the subpanel to an auxiliary power source and, responsive to a manual operation, connect the load center to the auxiliary power source and disconnect the load center from the primary power source. The transfer switch is further caused to maintain disconnection of the load center from the primary power source even when the primary power source is restored.

According to a further aspect, the invention contemplates a method of providing power to circuits of a building during primary power. The method includes automatically connecting a subpanel to an auxiliary power source when a primary power source fails to provide power to a load center and the subpanel. The method further includes automatically reconnecting the load center and the subpanel to the primary power source when the primary power source is restored, unless a load center circuit is connected to the auxiliary power source.

The present invention has been described in terms of the preferred embodiment, and it is recognized that equivalents, alternatives, and modifications, aside from those expressly stated, are possible and within the scope of the appending claims.

What is claimed is:

1. A power supply assembly that coordinates the supply of power in an electrical system that includes a load center that is normally powered by a primary power source and a subpanel interconnected with the primary power source and an auxiliary power supply, wherein a first set of one or more electrical circuits are interconnected with the load center and a second set of one or more electrical circuits are interconnected with the subpanel, the power supply assembly comprising:

a transfer switch that automatically connects the auxiliary power source to the subpanel so as to provide power from the auxiliary power source to the second set of electrical circuits when the primary power source fails to provide power to the subpanel; and an interlinked switch arrangement interconnected between the subpanel, the load center and the primary power source, wherein the interlinked switch arrangement is configured to isolate the load center from the primary power source, and is further configured to provide selective connection of one or more circuits of the first set of circuits to the auxiliary power source while auxiliary power is being supplied to the second set of circuits through the subpanel, when an operator desires that the selected circuits of the first set of circuits be powered by the auxiliary power source when the primary power source fails to provide power to the load center.

2. The power supply assembly of claim 1 wherein the auxiliary power source is an electrical generator and the primary power source is a utility power supply.

3. The power supply assembly of claim 1 wherein the one or more circuits of the first set of circuits are powered by the auxiliary power source through the subpanel when the interlinked switch arrangement is configured to connect the one or more of the circuits of the first set of circuits to the auxiliary power source.

4. The power supply assembly of claim 3, wherein the interlinked switch arrangement includes a primary power supply switch interconnected with the subpanel that is switched off when the interlinked switch arrangement is configured to provide selective connection of the one or more circuits of the first set of circuits to the auxiliary power source, so as to prevent the supply of power from the auxiliary power source to the transfer switch through the primary power supply switch.

5. The power supply assembly of claim 4 wherein the interlinked switch arrangement includes a main switch that connects the primary power source to the load center, an auxiliary feeder switch that connects the primary power source to the subpanel and the switch when the primary power source fails, and an auxiliary circuit switch that connects the selected load center circuits to the auxiliary power source.

6. The power supply assembly of claim 5 wherein the auxiliary feeder switch and the auxiliary circuit switch are in alignment with each other and are interlinked so that the auxiliary feeder switch and the auxiliary circuit switch cannot simultaneously be in the ON position.

7. A transfer arrangement for connection to a primary power source and an auxiliary power source for supplying power to a first distribution panel and a second distribution panel, wherein the first distribution panel includes a first set of circuits and the second distribution panel includes a second set of circuits, comprising:

means for automatically connecting the second distribution panel to the auxiliary power source when the primary power source is interrupted so as to provide power from the auxiliary power source to the second set of electrical circuits;

switch means interconnected between the primary power source, the auxiliary power source, the first distribution panel and the second distribution panel, wherein the switch means is responsive to a manual operation for connecting the first distribution panel to the auxiliary power source and disconnecting the first distribution panel from the primary power source, and for maintaining disconnection of the first distribution panel from the primary power source and isolating the first distribution panel from the primary power source when the primary power source is restored; and interlock means for preventing connection of the first distribution panel to the primary source upon restoration of the primary power source unless the first distribution panel is disconnected from the auxiliary power source;

wherein the switch means is configured to provide selective connection of one or more circuits of the first set of circuits to the auxiliary power source and to disconnect the first distribution panel from the primary power source while auxiliary power is being supplied to the second set of circuits through the second distribution panel, when an operator desires that the selected one or more circuits of the first set of circuits be powered by the auxiliary power source when the primary power source fails to provide power to the first distribution panel.

8. The transfer arrangement of claim 7, including a transfer switch that connects the auxiliary power source to the second distribution panel so as to provide power from the auxiliary power source to the second set of electrical circuits when the primary power source fails to provide power to the second distribution panel, wherein the switch means includes a primary power supply switch interconnected with the second distribution panel, and wherein the interlock means is configured such that the primary power supply switch is switched off when the switch means is configured to provide selective connection of the one or more circuits of the first set of circuits to the auxiliary power source, so as to prevent the supply of power from the auxiliary power source to the transfer switch through the primary power supply switch.

9. The transfer arrangement of claim 8 wherein the interlock means allows energization of the first distribution panel by the primary power source when the primary power source is restored and the first distribution panel has been disconnected from the auxiliary power source.

10. The transfer arrangement of claim 9 wherein the interlock means allows energization of the first distribution panel by the primary power source only upon manual disconnection of the first distribution panel from the auxiliary power source and manual reconnection of the first distribution panel to the primary power source.

11. The transfer arrangement of claim 8 wherein the first distribution panel is connected to the auxiliary power source downstream of the second distribution panel such that circuits of the first distribution panel are energized only if a load placed on the auxiliary power source by active circuits of the second distribution panel does not exceed a load capacity of the auxiliary power source.

12. The transfer arrangement of claim 8 wherein the auxiliary power source is an electrical generator and the primary power source is a utility power supply.

13. A method of providing power to a building during primary power failure, wherein the building includes a load center that is normally powered by a primary power source and a subpanel interconnected with the primary power source and an auxiliary power source, wherein a first set of one or more electrical circuits are interconnected with the load center and a second set of one or more electrical circuits are interconnected with the subpanel, the method comprising:
  automatically connecting the subpanel to the auxiliary power source when the primary power source fails to provide power to the load center and the subpanel so as to provide power from the auxiliary power source to the second set of electrical circuits when the primary power source fails to provide power to the subpanel;
  isolating the load center from the primary power source;
  selectively connecting one or more circuits of the first set of circuits to the auxiliary power source while auxiliary power is being supplied to the second set of circuits through the subpanel, when an operator desires that the one or more circuits of the first set of circuits be powered by the auxiliary power source when the primary power source fails to provide power to the load center; and
  automatically reconnecting the load center and the subpanel to the primary power source when the primary power source is restored unless one of the circuits of the first set of circuits of the load center is connected to the auxiliary power source.

14. The method of claim 13 further comprising manually disconnecting the load center from the primary power source prior to selectively connecting the one or more circuits of the first set of circuits with the auxiliary power source.

15. The method of claim 13 further comprising powering the subpanel and the load center in parallel when the primary power source is connected to the subpanel and the load center.

16. The method of claim 13, including a transfer switch that connects the auxiliary power source to the subpanel so as to provide power from the auxiliary power source to the second set of electrical circuits when the primary power source fails to provide power to the subpanel, wherein a primary power supply switch is interconnected with the subpanel, and including the step of switching off the primary power supply switch when the one or more circuits of the first set of circuits are connected to the auxiliary power source, so as to prevent the supply of power from the auxiliary power source to the transfer switch through the primary power supply switch.

17. The method of claim 16 further comprising restoring power from the primary power source to the load center only if the one or more selectively connected circuits of the first set of circuits has been manually disconnected from the auxiliary power source and the load center has been manually reconnected to the primary power source.

18. The method of claim 16 further comprising controlling connection of the primary power source to the load center to prevent backfeeding of primary power to the load center when the primary power source is restored and the one or more selectively connected circuits of the first set of circuits is connected to the auxiliary power source.

19. The method of claim 16 further comprising connecting the one or more circuits of the first set of circuits to the auxiliary power source when the primary power source fails, and wherein the one or more circuits of the first set of circuits is connected in series with second set of circuits of the subpanel.

20. An assembly that coordinates powering of a subpanel and a load center from a primary power source and an auxiliary power source when power to the load center and the subpanel from the primary power source is interrupted, wherein a first set of one or more electrical circuits are interconnected with the load center and a second set of one or more electrical circuits are interconnected with the subpanel, the assembly comprising:
  a transfer switch that connects the auxiliary power source to the subpanel so as to provide power from the auxiliary power source to the second set of electrical circuits when the primary power source fails to provide power to the subpanel;
  a subpanel feeder switch electrically interconnected between the primary power source and the subpanel, wherein the subpanel feeder switch is switchable between a first state in which power is supplied from the primary power source to the subpanel and a second state in which the supply of power from the primary power source to the subpanel is prevented;
  an auxiliary power input switch electrically interconnected between the auxiliary power source and the load center, wherein the auxiliary power input switch is switchable between a third state in which power is supplied from the auxiliary power source to the load center and a fourth state in which the supply of power from the auxiliary power source to the load center is prevented;
  an interlock interconnected between the subpanel feeder switch and the auxiliary power input switch, wherein the interlock is configured to prevent the subpanel feeder switch from being in the first state when the auxiliary power input switch is in the third state;
  wherein the interlock is further configured to selectively isolate the load center from the primary power source, and wherein the auxiliary power input switch provides selective connection of one or more circuits of the first set of circuits to the auxiliary power source while auxiliary power is being supplied to the second set of circuits through the subpanel, when an operator desires that the selected circuits of the first set of circuits be powered by the auxiliary power source when the primary power source fails to provide power to the load center.

21. The assembly of claim 20 wherein the interlock is further configured to permit the subpanel feeder switch to be in either the first state or in the second state when the auxiliary power input switch is in the fourth state.

22. The assembly of claim 20 wherein the interlock is further configured to prevent the auxiliary power input switch to be switched from the fourth state to the third state if the subpanel feeder switch is in the first state.

23. The assembly of claim 20 wherein the interlock is further interconnected with a main power supply switch that is switchable between a fifth state in which the supply of power from the primary power source to the load center is permitted and a sixth state in which the supply of power from the primary power source to the load center is prevented, and wherein the interlock is further adapted to prevent the main power supply switch from being switched from the sixth state to the fifth state if the auxiliary power input switch is in the third state.

24. The assembly of claim 20 wherein the interlock is further connected with a main power supply switch that is switchable between a fifth state in which the supply of power from the primary power source to the load center is permitted and a sixth state in which the supply of power from the primary power source to the load center is prevented, and wherein the main power supply switch may be switched from the fifth state to the sixth state independent of the interlock.

25. The power supply assembly of claim 20, including a primary power supply switch interconnected with the subpanel that is switched off when auxiliary power input switch is in the third state to provide selective connection of the one or more circuits of the first set of circuits to the auxiliary power source, so as to prevent the supply of power from the auxiliary power source to the transfer switch through the primary power supply switch.

* * * * *